Sept. 21, 1954  A. J. HORNFECK  2,689,477
APPARATUS FOR MEASURING HEATING VALUE OF FUELS
Filed March 21, 1950  4 Sheets-Sheet 2

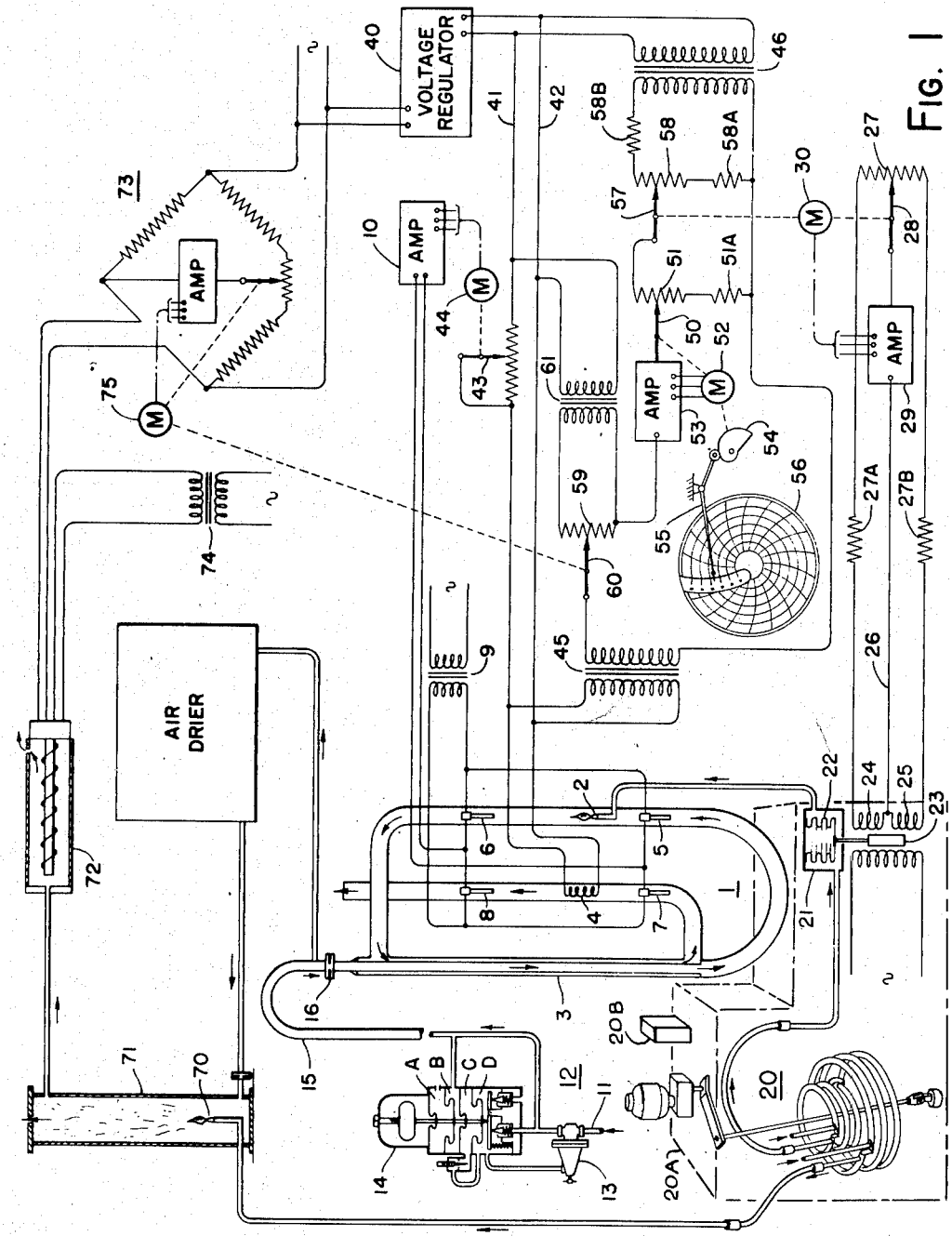

INVENTOR.
ANTHONY J. HORNFECK
BY
*Raymond W. Jenkins*
ATTORNEY

Sept. 21, 1954  A. J. HORNFECK  2,689,477
APPARATUS FOR MEASURING HEATING VALUE OF FUELS
Filed March 21, 1950  4 Sheets-Sheet 4
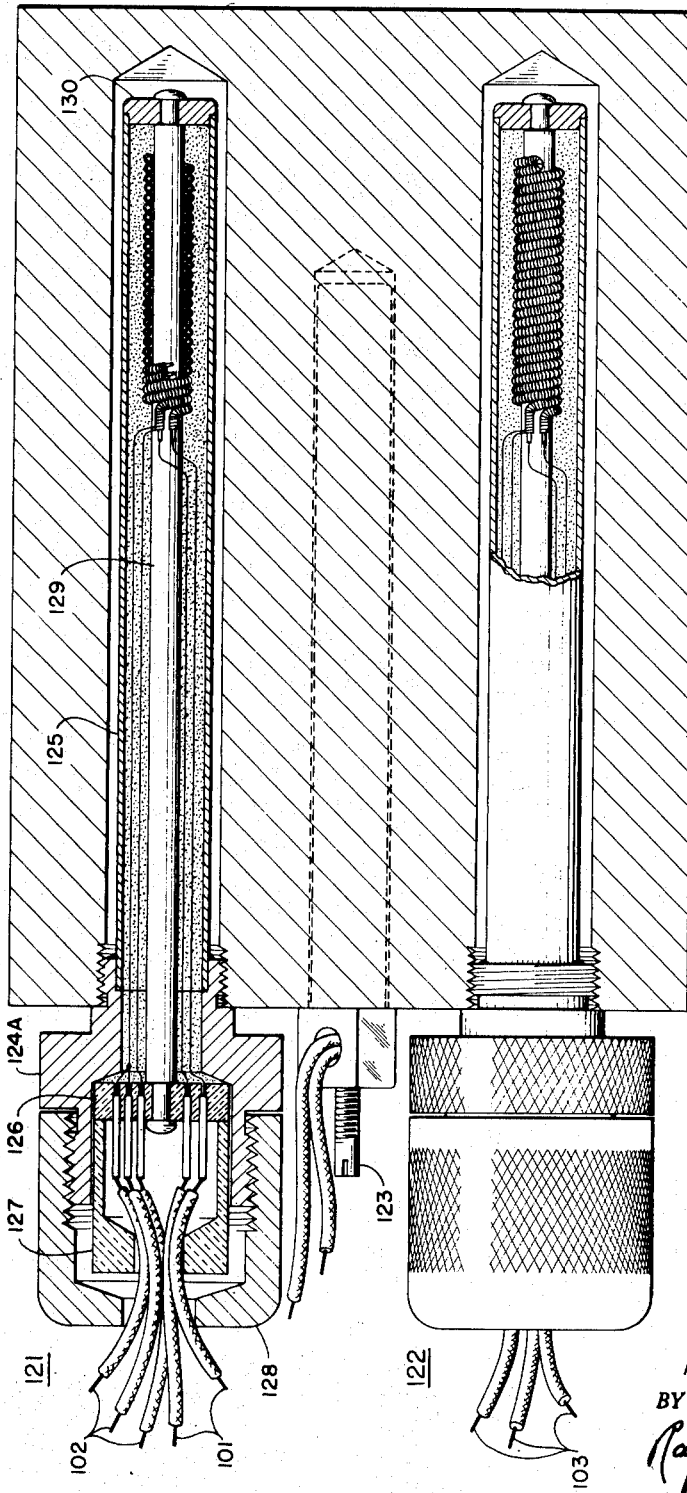
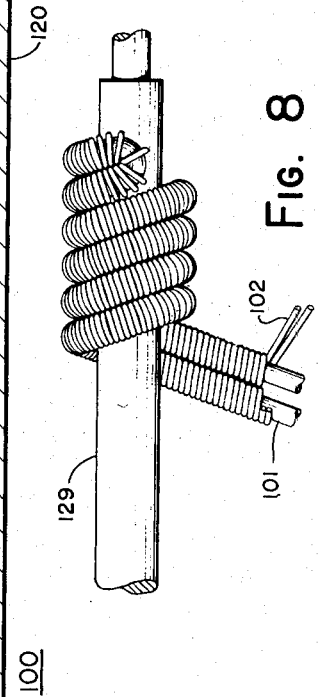
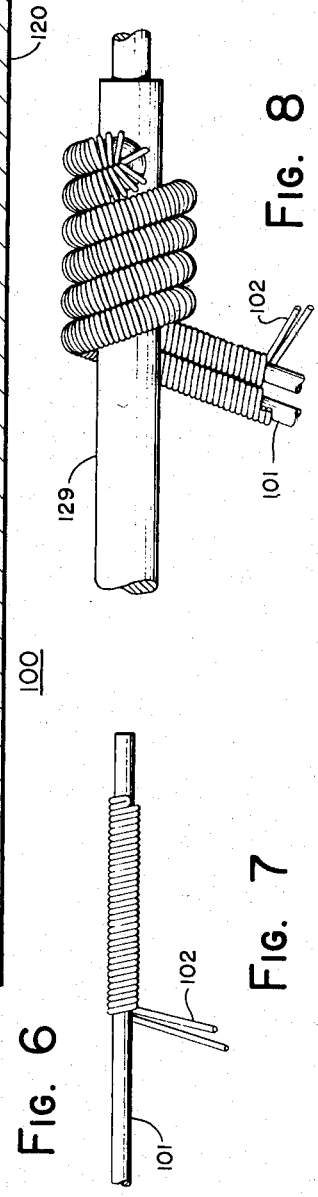
INVENTOR.
ANTHONY J. HORNFECK
BY
*Raymond W. Junkin*
ATTORNEY Patented Sept. 21, 1954

2,689,477

UNITED STATES PATENT OFFICE 2,689,477

APPARATUS FOR MEASURING HEATING VALUE OF FUELS

Anthony J. Hornfeck, Lyndhurst, Ohio, assignor to Bailey Meter Company, a corporation of Delaware Application March 21, 1950, Serial No. 150,850

7 Claims. (Cl. 73—190)

Theoretically there is a certain temperature of the products of combustion which can be reached by perfect combustion of fuel, such performance being termed the pyrometric thermal efficiency. It is obvious that it becomes an object in calorimetry to so protect the combustion process from uncontrolled variables that pyrometric thermal efficiency of the products of combustion is approached and the resulting temperature rise of the absorbing medium observed or recorded. In determination of the thermal value of the combustible, account must be taken of the quantity of hydrogen therein, which is oxidized to water, or burned to steam. It is according as this water is condensed, and its heat released, transferred, or maintained in the vapor state, that there is obtained an indication of the higher and lower calorific values, respectively.

In the United States commercial, gaseous fuel is usually sold to customers on the basis of its higher heating value. Objection is raised when comparison is made to other cities or countries which base their rates on the lower heating value. It might be possible to meet the objection if the high and low heat values maintained a constant ratio as the constituents of the fuels varied. It would then appear that a customer in the United States obtained a consistently proportional amount of heat for his money when compared with the continental user, and the problem of obtaining equality would evolve into a simple matter of economics.

However, the ratio of higher and lower heat values varies with the hydrogen content of the fuels. Therefore, the United States customer finds that as the high heat value of his fuel mounts with hydrogen content increase his cost rises as some definite function of such increase. However, the heat actually available, namely the lower heat value, does not rise as such same function.

By the term "heat available" reference is made to that quantity of heat of a combustion process which the customer ordinarily transfers to a working fluid by a heat exchanger. Commercial heat exchangers do not utilize the heat residual within the steam of combustion as heat of vaporization; exhaustion of the products of combustion taking place prior to condensation.

As traditional usage continues to influence the system of charging to consumers on the basis of higher heating value there remains the need of a device to continuously determine both values to enable manufacturers to control the quality of their product and calculate charges to their customers.

My invention is in connection with a calorimeter of the re-heat, continuous-flow type in which a gaseous, heat-absorbing fluid containing free oxygen is successively heated in two separate steps at commensurable input rates. The first of the two steps brings about a temperature rise by burning an unknown combustible in the so-called carrier fluid to impart its combustion heat thereto. The second, counter-balancing step may be instigated by means of an adjustable heating device whose rate of thermal output is measurable and which is capable of inciting a temperature rise in the carrier fluid that equals the temperature rise of the first step. With the temperature rises occurring in the combustion and re-heat steps maintained equal, a comparative type of measurement is accorded for evaluating the rate of heat supplied by the unknown combustible in terms of an equivalent known heating effect.

A body, or housing, is provided through which the carrier fluid is passed for the combustion-heating and re-heating of the two steps and which supports the burner for the combustible, the re-heater and the thermal-measuring elements. At least one point of novelty resides in the incorporation of the thermo elements necessary to detect the two temperature differences within the calorimeter body in the manner that the variation of the measurable input heat needed to maintain a balance between the two temperature rises may be utilized to simultaneously indicate and/or record said variation as the B. t. u. value variation of the unknown combustible.

Another object of the present invention is to provide an instrument which is accurate and in which the accuracy of its various components can be easily checked.

An additional object of the invention is to provide an instrument whose indication is dependent only of the heat values of the fuel.

A further additional object is to provide an instrument whose indication is unaffected by ordinary changes in atmospheric conditions, such as changes in temperature and barometric pressure.

A still further additional object of the invention is to provide an instrument which will be fully automatic and which will persent either a visual indication and/or a record on a paper or other article.

Fig. 1 represents a schematic view of the principal parts of a calorimeter assembly embodying my invention.

Fig. 6 is a cross-sectional detailing of the thermal converter.

Figs. 7 and 8 are details of construction of Fig. 6.

Figure 5:
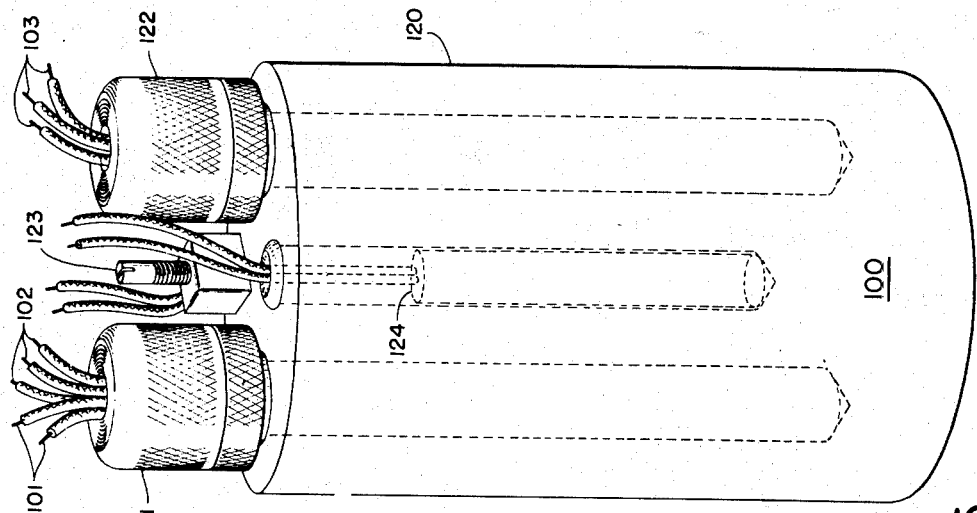
Fig. 5 is a perspective view of the thermal converter unit utilized in the system of Fig. 4.

Referring specifically to Fig. 1, there is shown at 1 a calorimeter body of the gaseous, continuous-flow, re-heat type. Combustible gas of unknown B. t. u. content continuously flows to, and is burned with optimum efficiency at, burner 2, combustion being supported by the carrier fluid passed through the calorimeter body. Heat given up to the carrier fluid by combustion is imparted by a heat-exchanging relationship to that portion of the fluid initially entering the calorimeter body in the exchange section 3 of the body. This means that two, separate streams of carrier fluid leave the heat exchange section 3 at substantially the same temperature.

The carrier air heated by the gas of unknown B. t. u. content is then reheated by an electrical heater 4 over the same range of temperature it was heated by the combustion and the measurement of the energy required to reheat the carrier fluid is the evaluation of the lower heating value of the gas.

The carrier fluid is spoken of as being heated and reheated in the body when technically the reheating is of the fluid plus whatever products of combustion are added by the combustion at the burner. Actually, as the products of combustion vary in character upon changes in the composition of the gas, the specific heat of the resulting mixture of carrier fluid and products of combustion alter the record of this type of calorimeter. However, this particular effect is sufficiently minimized by the large ratio between the volumes of carrier fluid and gas burned. This ratio is maintained constant in the order of 500 to 1 and is adjusted to an optimum value so as to conform to the varied characteristics of the calorimeter components. Therefore, the entire flow through the body will be referred to only as the carrier fluid for reasons of simplicity, despite the recognized inconsistency.

Thermo elements 5 and 6 measure the temperature of the carrier fluid before and after it is heated by the combustion, and thermo elements 7 and 8 measure the temperature of the carrier fluid before and after it is reheated by the heater 4. The four thermo elements are formed into a Wheatstone bridge network, as shown more clearly by the schematic illustration of Fig. 2, with a power source 9 and a motor-control amplifier 10 which may take the form of that disclosed in the patents to Ryder 2,275,317; Ryder 2,333,393; or Hornfeck 2,437,603.

As indicated supra, the carrier fluid is one which will support combustion and is practically limited to air. The source for this air may be a conventional pump (not shown) which delivers the air, by conduit 11, to pressure controller 12. Controller 12 comprises a commercial diaphragm reducing valve 13 and a relay 14 such as disclosed by the patent to Gorrie Re. 21,804. It is convenient to provide the relay 14 with its required supply of air from conduit 11. Then, if the air supply is also introduced into the B chamber of the relay, any fluctuation in its pressure will be magnified and imposed upon the diaphragm of reducing valve 13 to maintain the output of the controller, as a unit, at a constant value. Further assurance of the stableness of the air supply may be gained by placing a second reducing valve similar to 13 ahead of valve 13 in conduit 11, but the arrangement as shown suffices for fluctuations in pressure normally expected in a supply from the conventional pump.

The air supply, therefore, emerges from controller 12 into conduit 15 preparatory for entrance into the calorimeter body 1 with pressure fluctuations eliminated or reduced to inconsequential values. A critical orifice 16 is placed in conduit 15 at the entrance to the body 1 to nullify the back pressure from the passes of the body 1. The carrier air pressure is thereby controlled to conform to the characteristics of the burner used to produce combustion at optimum efficiency.

A constant-volume pump, taking the form of that comprising the subject matter of co-pending application S. N. 53,671, filed October 9, 1948, now Patent 2,607,525, issued August 19, 1952, of McEvoy, is shown at 20 where it simultaneously supplies the combustible sample at constant volume to burner 2 and to the high-heat compensator to be described et seq. The pressure on the inlet side of the pump is maintained equal to that pressure within the calorimeter body 1 so that the pressure drop across the pump is negligible and the density of the gas delivered to burner 2 is referable to barometric pressure.

Between pump 20 and burner 2 the gas is conducted through a chamber 21 in order that its volumetric fluctuations due to barometric pressure may act upon bellows 22. To eliminate the effect of any temperature effect on the density of the combustible as a gas as it is conducted through both pump 20 and chamber 21, a heated enclosure 20A is provided with thermostat 20B which maintains the gas at a temperature sufficiently above room temperature to eliminate the effect of ambient temperature fluctuations. The movable core 23 of a transformer assembly depends from bellows 22 and is vertically positioned in accordance with the change in volume of the bellows. The primary coil of the movable core assembly is energized and its resulting electromagnetic field is variably coupled through movable core 23 with secondary coils 24 and 25 arranged in bucking relation to one another.

Obviously, with core 23 at the neutral of coils 24 and 25, equal voltages are induced across them and the voltage appearing at their junction is zero. Resistance element 27 is arranged in circuit with coils 24 and 25 movable contactor 28 is positioned along resistor 27 to balance any voltage appearing in conductor 26 joining contactor 28 and the junction of coils 24 and 25. A motor controller-amplifier 29 is inserted in conductor 26 which detects the appearance of voltage unbalances and controls a motor 30 which simultaneously rebalance the circuit by positioning contactor 28 and compensates the fundamental measuring circuit by positioning compensating contactor 57. Resistances 27A and 27B are inserted in the circuit for calibration purposes.

Returning to the locale of body 1, in Fig. 1, it is well to refresh in mind that the primary object in this embodiment is the measurement of the voltage drop across electric re-heater element 4. Voltage regulator 40 keeps the voltage of the source constant and may assume one of the commercial, common forms. Conductors 41 and 42 join re-heater 4 and regulator 40 in circuit, with rheostat 43, for regulation of the electrical energy going to the re-heater 4. Rheostat arm 43 is positioned by motor 44, under control of motor controller-amplifier 10 which is sensitive to any unbalance of Wheatstone bridges 5, 6, 7 and 8.

Fundamentally, the measurement of the power going into re-heater 4 to maintain balance of bridges 5, 6, 7 and 8 consists of comparing the voltages between conductors 41 and 42 before and after the rheostat 43. A comparison is accomplished by imposing both voltages on the primary windings of transformers 45 and 46 and forming the secondary windings of the transformers into a circuit whose restoration to balance becomes a measure of the power dissipated in heater 4. In further detail, the fundamental circuit is balanced by movement of contactor 50 along resistor 51, by motor 52, under control of motor-controller amplifier 53 which detects the unbalance of the circuit. By conventional linkage the balancing action of motor 52 is simultaneously imparted to cam 54 as well as balancing contactor 50 that the indicator 55 may be positioned upon revoluble chart 56.

The fundamental circuit has calculated into it two variable factors. Barometric variations alter the density of the gas being analyzed with consequent variation of B. t. u. given up in combustion per unit volume. My invention provides for this factor of barometric variation to compenate the fundamental circuit in order that the final indication of B. t. u. of the analyzed gas be that of the gas at standard pressure. The factor of temperature is taken care of as indicated supra by heating the gas in pump 20 and housing 21 to some constant temperature above ambient variations and adjusting the system at such point as the cam 54 in order that the final indication will be given a linear bias that the record will be as of the standard temperature. With contactor 57 positioned by motor 30 in accordance with barometric variation of density, the cooperation with the resistance 58 multiplies the voltage appearing across the secondary of 46 to give a voltage across 51 and 51A adjusted in direction and extent to make the final result indicated by 55 read as the B. t. u. value of the gas at standard conditions of temperature and pressure.

Additional compensation of the fundamental circuit is accomplished to reflect the high-heat value of the analyzed gas. This factor holds an additive relation to the B. t. u. value fundamentally indicated by the measuring system thus far disclosed in connection with calorimeter body 1. This factor adds to the voltage appearing across the secondary of transformer 45 in the fundamental circuit, and the restoration of balance by 50 being positioned along 51 will therefore indicate the higher heating value of the analyzed gas. Specifically, a resistance 59 is placed in circuit with the secondary of transformer 61 whose primary is energized from a source of electrical energy and a portion of the voltage appearing across resistance 59 is selected by positioning of contactor 60 with motor 75 in accordance with the magnitude of the difference between the high-heat and low-heat values of the analyzed gas. The indication given by 55 on chart 56 then becomes the high-heat value of the gas at standard conditions.

Resistance 51A, 58A and 58B are placed in the fundamental circuit for calibrating purposes, 58B being for range purposes and 51A and 58A being provided for suppression purposes.

Of course the voltage across re-heater 4 is proportional to the square root of the heat emitted as designated in B. t. u. Actually then, the voltage on, and imposed by, transformer 45 is a non-linear factor to which the linear factor, expressed by the voltage picked from resistance 59 by contactor 60, is added and compared to the linear factor expressed by the voltage of 51 and 51A picked by contactor 50 movement. An exact calibration is therefore impossible. However, as a practical matter, the approximation attained is fairly accurate because of the relatively narrow ranges of compensation of the two linear factors.

As heretofore indicated, pump 20 has separate sections from which burner 2 and the high-heat compensator are simultaneously supplied. The gas passing to the high-heat compensator is conducted to, and burned at, burner 70 within chamber 71. The high-heat compensator forms the subject matter of copending application by Barnard and McEvoy Serial No. 150,962, filed March 21, 1950, and is described here only in sufficient detail to explain its function of compensation of the fundamental circuit of my invention.

Since the difference between the high and low heating value of the gaseous fuel is directly dependent on the quantity of water formed from the combustion of the gas, it is evident that any means whereby the lbs. of water formed per cu. ft. of gas burned can be determined offers a means of fixing the difference between the higher and lower heating values. If a constant volume of gas is supplied the combustion chamber, together with a constant weight of air, it is evident that a measurement of the lbs. of water per lb. of dry air is a measure of the lbs. of water formed per cu. ft. of gas burned for conditions of standard temperature and pressure.

It is established that a hot bulb hygrometer, here referred to as the Dewcel, when placed in air containing water vapor, assumes a temperature related to the partial pressure of the water vapor in the air, or the lbs. of water per lb. of dry air. It therefore offers a means of measuring the weight of water formed from the combustion of a constant volume of gas, provided the lbs. of dry air per minute furnished to the combustion chamber do not vary.

Ambient temperature and barometric pressure fluctuations make it impossible to maintain a fixed ratio between the lbs. of air furnished and the cu. ft. of gas burned with only the means disclosed. The weight of air flow will vary as the square root of the density, since its flow depends on a differential. However, the density changes resulting from fluctuations in pressure with the means disclosed will be small, (about 2% max.) and those from temperature about 3% max. Thus it is practical to state that I supply the gas at a constant volume and temperature to the high-heat compensator and maintain the carrier, or combustion, air at a constant pressure and in a dry condition.

Dry combustion air is supplied chamber 71 from a drying device which, as indicated supra, takes air from conduit 15 ahead of critical orifice 16 to utilize the constant supply pressure of that source. An orifice is placed between the air drier and the combustion chamber 71 to insure an air supply magnitude that the resulting amount of humidity added by combustion will fall within range of the Dewcel placed in the flow of air and water vapor.

Combustion chamber 71 consists of a vertical cylinder, provided with an inlet tube for the combustion or carrier air, and a gas burner. The top of the combustion chamber is given an adjustable outlet to make it possible to operate with a slight back pressure in the combustion chamber. The slight back pressure is desirable to secure circulation of the products of combustion over the Dewcel in chamber 72 instead of depending on diffusion alone. To secure circulation, a small hole is provided in the rear of chamber 72, and the back pressure in chamber 71 increased until circulation takes place through chamber 72.

With a flow of carrier air over the Dewcel established, a power source 74 heats the Dewcel in proportion to the moisture present. This heat of the Dewcel varies the resistance of a leg of Wheatstone bridge 73 associated therewith and the balance of the bridge is restored by motor 75 simultaneously with positioning of contactor 60 along 59 for the desired, additive, compensation of the fundamental measuring circuit. Therefore, balance of the fundamental circuit causes 55 to indicate the high-heat value of the gas at standard temperature and pressure.

Figure 3:
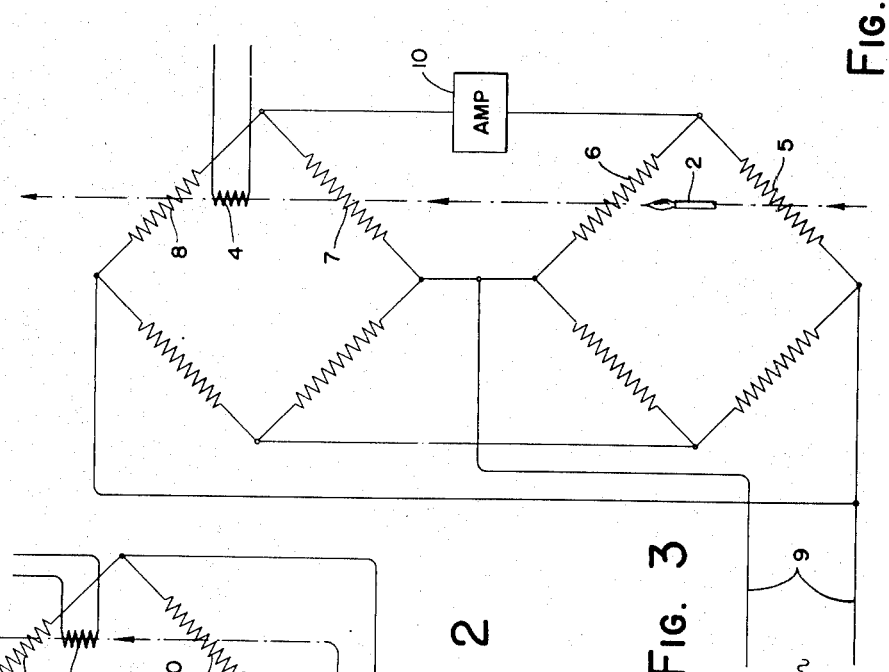
Fig. 3 is a diagrammatic representation of a second practical manner of combining the thermo elements of the calorimeter body in two Wheatstone bridges.
Figure 2:
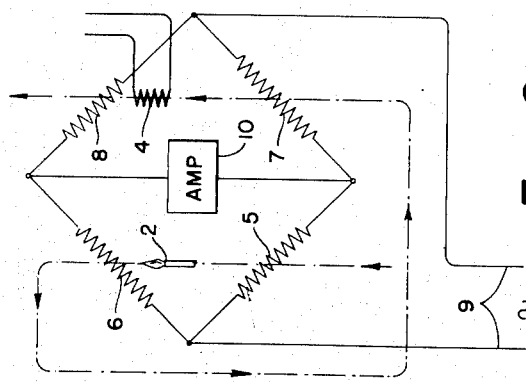
Fig. 2 is a diagrammatic representation of the preferred arrangement of the thermo elements in the calorimeter body as a Wheatstone bridge.

Referring to Figs. 2 and 3 there are shown, diagrammatically, two practical arrangements of thermo elements in Wheatstone bridge systems about the gas burner 2 and re-heater 4 of body 1 in such manner that a difference in the amount of heat delivered to the carrier air flowing successively over thermos 5, 6, 7 and 8 will be appraised by motor controller-amplifier 10. Fig. 2 is the arrangement of 5, 6, 7 and 8 shown in Fig. 1, while Fig. 3 is an alternate arrangement of the same thermos utilizing separate Wheatstone bridges for the gas burner 2 and re-heater 4. In each case the unbalance detected by motor controller-amplifier 10 indicates the same condition, a difference in thermal input to the carrier air by the combustion of the unknown gas at 2 and the re-heater 4.

Figure 4:
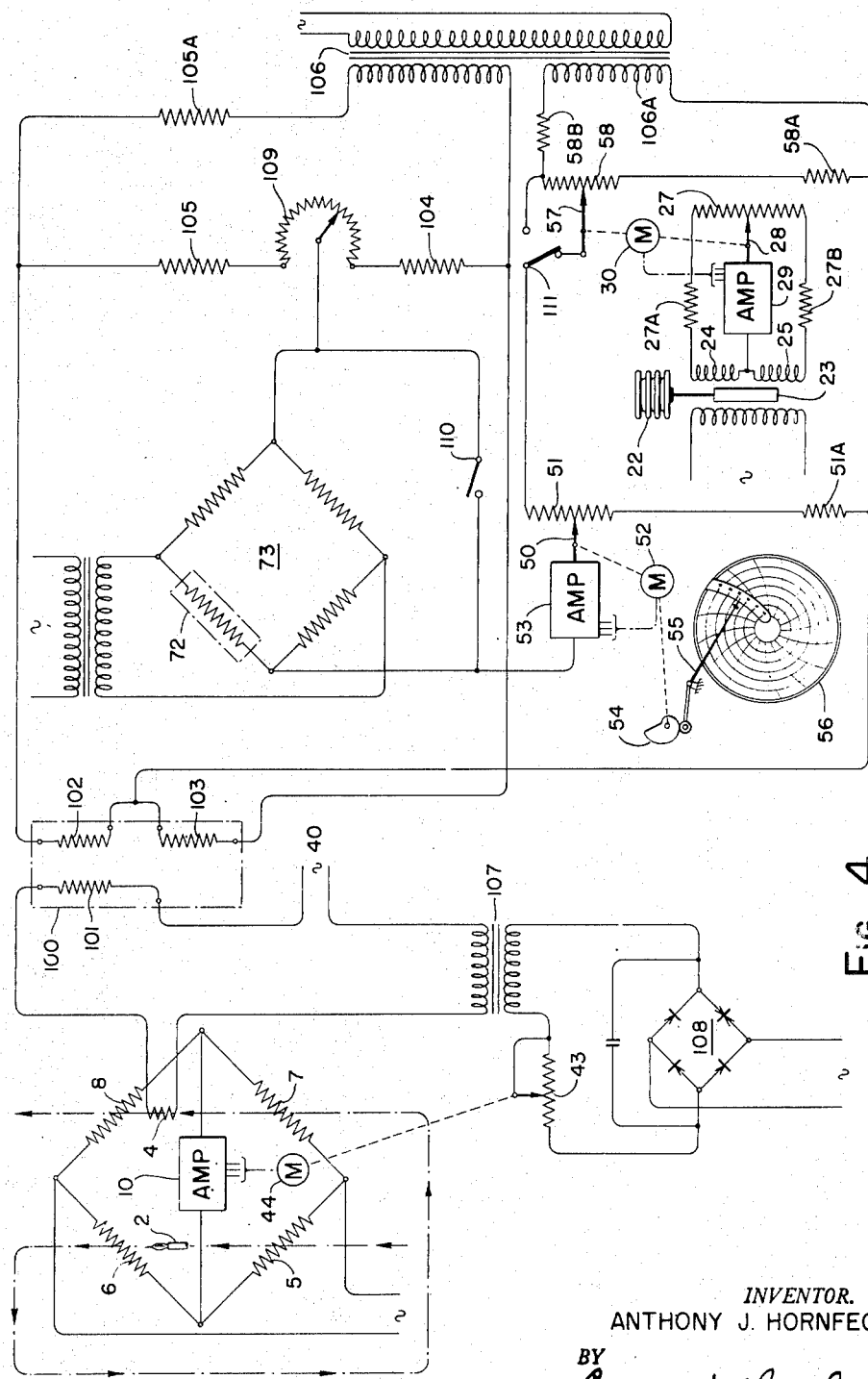
Fig. 4 is a schematic representation of another embodiment of my invention utilizing the thermal conversion principle of power determination.

The requirement of a more refined method of measurement produced the embodiment of Fig. 4. The measurement of the power dissipated in re-heater 4 is made by a thermal converter, schematically depicted at 100, forming the subject of a copending application by McEvoy and myself. The re-heater 4 is placed in circuit with the resistor element 101 of the thermal converter 100 in order that the electrical energy in the circuit will have a proportionate amount dissipated in the thermal converter 100 as heat whose temperature will be detected by thermo element 102, a leg of the Wheatstone bridge 102—103—104—105 whose power source is 106. The supply voltage and heater current wave form and phase will have no effect on the accuracy of this system, and so long as the heater resistance remains constant the thermal converter will be a basic power measuring device. Because of the integrating characteristics of the thermal converter, transient and cyclic variations such as that produced by the gas pump will be smoothed out in the final record. A saturable reactor or an electronically operated power regulator can be used in place of the rheostat of Fig. 1 in which case the actual mechanical design of the controller can be greatly simplified.

In the circuit of re-heater 4 and power resistance 101, it is to be observed that a constant voltage is applied to the circuit at 40 while the current flow is controlled by saturable reactor 107. Saturable reactor 107 itself has the current in its D.-C. winding controlled by the position of rheostat 43 which is in circuit with D.-C. converter 108 and saturable reactor 107. The contactor of rheostat 43 is positioned by motor 44 which is under the control of motor controller-amplifier 10, sensitive to the unbalance of Wheatstone bridge 5—6—7—8, created by deviation between the heat dissipations of burner 2 and re-heater 4 in the carrier air.

Returning to the thermal converter 100 and its resistances 102 and 103 which are incorporated into Wheatstone bridge 102—103—104—105, it is noted that the comparison of voltage output of this Wheatstone bridge 102—103—104—105 to that supplied the basic loop measuring circuit by source 106 gives the lower-heat value of the unknown gas. The final balance in the loop circuit is obtained by movement of contactor 50 along resistor 51 by motor 52, controlled by motor controller-amplifier 53 which is sensitive to the unbalance existing across Wheatstone bridge 102—103—104—105. The unbalance of Wheatstone bridge 102—103—104—105 is modified by the output of high-heat compensator bridge 73 which has one leg, associated with Dewcel 72, functioning as discussed in connection with Fig. 1.

Wheatstone bridges 73 and 102—103—104—105 are never balanced per se but have their combined outputs balanced in the basic loop measuring circuit against the reference voltage of secondary 106A as modified by the density factor bridge. In bridge 102—103—104—105 the service of resistance legs 102 and 103 in thermal converter 100 may cause a "drift" in its resistance value in a preliminary installation until stabilization is accomplished. Irregularities of this nature may be compensated by adjustment of resistance 109 which adds to one side or the other of the bridge as the calibration discloses is necessary.

Another problem apparent to those skilled in the art is found in the attempt to secure a linear voltage output from bridge 102—103—104—105. The problem also exists with bridge 73 as well but is not as serious because of the small extent to which it is unbalanced. However, in 102—103—104—105 the increase in resistance with temperature of the bridge elements causes a substantial falling, or "drooping," of the output voltage in relation to the value of the current squared. If the input circuit to the 102—103—104—105 bridge were given an extremely high resistance and consequently low current with high voltage, the relation between the output voltage and the current would become more linear in variation. However, there are of course practical limitations in that direction of compensation. If a material with a rising temperature coefficient of resistance, such as nickel, were used in bridge leg 102 its effect would tend to cancel out the "drooping" effect of the bridge and promote linearity of output. I have found that with these concepts a practical design is possible for resistance element 105A and the output of this 102—103—104—105 bridge can be made practically linear over the measured range of B. t. u. contemplated and thereby eliminate the necessity of adding a phase sensitive motor controller with motor and compensating cam to produce linearity of the bridge output prior to introduction in the basic loop circuit.

The compensation of the embodiment of Fig. 4 in proportion to the barometric density variation of the gas is accomplished in the same manner as in Fig. 1. Motor 30 is caused to position contactor 57 in accordance with the density variation of the gas and that part of the voltage of 106A which is picked off by the divider 57 is a divisional factor in the final algebraic manipulation in the final balance of resistance 51.

Provision for checking the calibration of the various units of the measuring circuit are made by providing switches 110 and 111. When switch 110 is closed from the position shown, Wheatstone bridge 73 with Dewcel 72 is eliminated from having its compensating effect on the unbalance in the conjugate connection across Wheatstone bridge 102—103—104—105 in which the motor controller-amplifier 53 is placed. This means the uncompensated final indication of 55 is then of the low-heat value of the gas.

When switch 111 is moved to the position alternate from that shown the density compensator is bypassed in the circuit and the final record is of the low-heat or high-heat value of the gas as it flows from its source with its density under barometric pressure influence.

Referring now to Fig. 5, there is shown in perspective the thermal converter 100 of Fig. 4 which forms the subject matter of the application of McEvoy and myself, mentioned supra. The converter is disclosed here as being used to measure power in a circuit, but as also explained in the application relating to it, the uses to which it might be placed are not limited by the specific disclosure of these applications.

The thermal converter here is given the form of Fig. 5 with its solid metallic housing 120 having wells bored to accommodate the resistance elements 101—102—103, a thermostat 123 and a heating device 124. Resistance elements 102 and 101 are in an assembly to be described in greater detail and now generally designated as 121 while resistance element 103 is embodied in an assembly 122 thermally similar to 121. Assemblies 121 and 122 are placed in their respective wells, diametrically opposed across the vertical axis of cylindrical block 120 in order to maintain thermal balance of 100 as a unit. Following the general plan of thermal balance, a heater element 124 and thermostat 123 are placed in wells equidistant from the wells of assemblies 121 and 122 or rather, all wells are arranged symmetrically about the vertical axis of the housing block. With heater 124 of a common commercial electrical type under control of thermostat 123, the block 120 is heated above ambient temperature to the degree that the only change in temperature between resistance elements 102 and 103 will be that due to the heat emitted by power element 101. Therefore, the difference in temperature between 102 and 103 is made proportional to the electrical energy dissipated by power element 101 which is proportional to the electrical energy dissipated by heater 4 in its maintenance of a thermal balance between legs 7 and 8 and legs 5 and 6 of their Wheatstone bridge in calorimeter body 1.

Referring now to Fig. 6 there is shown in partial section, and greater detail than in Fig. 5, the relative position of the components of assembly 100. Primarily the purpose of the form of the assembly is to obtain the maximum temperature rise from the heat released by power element 101.

Both 121 and 122 are identical in construction to preserve thermal balance over the anticipated range of temperature that will be carried by heater 124 and power element 101, so an explanation of one will suffice as an explanation of the second. Basically, assembly 121 consists of a metallic base 124A which is screwed into the mouth of its block well in order that the depending shell 125 extends down into the well, clearing the bottom by a relatively small amount. Inside 124A a cylindrical bore coincides with shell 125 to give a smooth junction of their inside diameters. The lower, first bore of 124A terminates in an upper second bore of diameter sufficiently large to accommodate the terminal posts of the thermo and power elements. The terminal posts are mounted in an insulating base 126 fitting into the upper larger bore of 124A and are protected by a cap 126 of similar insulating properties. The entire assembly within 124A is protected by a metallic cap 128 which screws over 124A and has the necessary aperture to allow emission of electric connections from the terminal posts of the thermo and power resistances. Base 126, besides bearing the terminal posts, has depending from its center, to the end of casing 125, a metallic rod 129. Rod 129 extends down casing 125, bearing the thermo and power elements wrapped thereupon in a manner to be later described in greater detail, and is anchored against vibration by extension through cap 130, pressed into closing the lower end of 125. Rod 129 is given a brad on the outside of 126 and 130 resulting in firm securance against vibration in relation to other parts of the assembly. With 101 and 102 insulated electrically from each other, they are wound from the lower end of rod 129 and the space between the rod 129 and the internal wall of 125 is filled with magnesium oxide to give increased stability against vibration and insulation, a uniform path of heat flow to the heat of the assembly, and a rapid conveyance of the heat of power element 101.

Referring now to Fig. 7, power element 101 is simply shown with thermo element wire 102 wound noninductively thereon, being electrically insulated by tape or other covering.

Fig. 8 discloses how once resistance 102 is noninductively wound about power element 101, 101 itself is noninductively wound about rod 129 which results in 102 being formed coil-coil about rod 129. The arrangement promotes uniform, intimate association between elements 102 and 101 for most efficient transfer of the heat of 101 and 102 for the required measurement of temperature rise. Companion assembly 122, with thermo element 103, contains an identical arrangement of windings but in place of power element 101 an identical conduit is used that thermal balance between 121 and 122 be maintained.

When formed as disclosed, the thermal converter is a very stable unit and adequately performs the function, in the embodiment of Fig. 4, of measuring the power in the circuit of the reheater of the calorimeter.

Wherever a continuous flow calorimeter of the gaseous re-heat type is mentioned in this application, such calorimeter is deemed to be the type as described and disclosed by Keith Patent 2,026,179 issued on December 31, 1935.

What I claim as new and desire to secure by Letters Patent of the United States, is:

1. A continuous flow calorimeter of the gaseous type having a combustion section and a reheat section in series flow connection, a source of combustion supporting carrier air, a heat exchanger connected to the source of air and combustion section to heat and direct the air into the combustion section and to receive the air and products of combustion from said combustion section, said heat exchanger cooling the air and products of combustion and directing the air and cooled products of combustion into the reheat section so that the carrier air entering the combustion section will be at substantially the same temperature as the air and products of combustion entering the reheating section, a burner in the combustion section, a source of gaseous fuel connected to the burner, the improvement including in combination, means connected to the fuel source for maintaining the gaseous fuel at a constant temperature above ambient temperature variation, a regulating system for the supply of combustion supporting carrier air delivered to the combustion section, pump means for delivering a constant volume of gaseous fuel to the burner, a second source of heat in the reheating section for reheating the carrier air and products of combustion from the combustion section with a determinable amount of energy over the span of combustion temperature rise, means connected to the second source of heat for measuring the energy used thereby, and means responsive to barometric pressure connected to the measuring means for adjusting the measured value to standard conditions so that the indication is of the lower heating value of the gas at standard conditions.

2. The combination of claim 1 wherein thermal elements are placed in the combustion and reheat sections and connected in a Wheatstone bridge which compares the temperature rises of the carrier air, and means sensitive to the Wheatstone bridge unbalance controlling the second source of heat.

3. The combination of claim 2, wherein, the means for measuring the energy used in the second source of heat which is a power resistance across which a voltage is applied includes, a reference voltage source, a comparison network for the reference voltage and the voltage across the power resistance, means sensitive to the unbalance of the comparison network, and means controlled by the means sensitive to the comparison network unbalance for rebalancing the comparison network and indicating the rebalance motion as the heat value of the fuel.

4. The combination of claim 3 wherein the means responsive to barometric pressure multiplies the reference voltage of the comparison network in adjusting the measured value of the fuel to standard conditions.

5. A continuous flow calorimeter of the gaseous type having a combustion section and a reheat section in series flow connection, a source of combustion supporting carrier air, a heat exchanger connected to the source of air and combustion section to heat and direct the air into the combustion section and to receive the air and products of combustion from said combustion section, said heat exchanger cooling the air and products of combustion and directing the air and cooled products of combustion into the reheat section so that the carrier air entering the combustion section will be at substantially the same temperature as the air and products of combustion entering the reheating section, means connected to the combustion section for supplying the sections sequentially with definite volumetric proportions of a gaseous combustible and combustion supporting carrier air, thermostatically controlled heating means for maintaining the combustible supplied at a level of temperature wherein transient ambient temperature changes will not change its density, a first electric network sensitive to temperature in the combustion and reheat sections and unbalanced by a difference in temperature rises of the carrier air through the sections of the calorimeter, a second electric network for detecting the unbalance of the network, a heating resistance across which a voltage is applied in the reheat section, means regulating the voltage applied to the heating resistance under the control of the electric network detector, a power dissipating resistance in series with the heating resistance and the applied voltage, a third electric network unbalanced in accordance with the temperature of the power dissipating resistance, means establishing a reference voltage, a comparison electric network for the reference voltage and the unbalance voltage of the third network, and means detecting and eliminating and indicating the unbalance of the comparison network as a measure of the energy used in the heating resistance which is proportional to the heating value of the combustible.

6. The combination of claim 5 including, an expansible chamber responsive to barometric pressure, and means responsive to movement of the chamber mechanically connected to an adjustable resistance in the comparison circuit to vary the unbalance of the comparison network for adjusting the indication of the measured value of the heat energy to standard conditions.

7. The combination of claim 6 in which a manually operated switch is provided for eliminating the adjustment of the comparison circuit as given by the structure responsive to barometric pressure.

References Cited in the file of this patent

UNITED STATES PATENTS

| Number | Name | Date |
|---|---|---|
| 1,997,383 | Junkers | Apr. 9, 1935 |
| 2,026,179 | Keith | Dec. 31, 1935 |
| 2,026,180 | Keith | Dec. 31, 1935 |
| 2,238,606 | Schmidt | Apr. 15, 1941 |

FOREIGN PATENTS

| Number | Country | Date |
|---|---|---|
| 503,164 | Great Britain | Apr. 3, 1939 |
| 902,952 | France | Jan. 3, 1945 |

OTHER REFERENCES

"Data Book on Hydrocarbons," by Maxwell (John Nostrand Co.), 1950, pp. 2–5.